July 15, 1924.

O. H. CLARKE

SPOT OR SEARCH LIGHT ASSEMBLY

Filed March 17, 1920

Inventor
Oliver H. Clarke
By Shreve, Crowe & Gordon,
Attorneys

July 15, 1924.
O. H. CLARKE
1,501,704
SPOT OR SEARCH LIGHT ASSEMBLY
Filed March 17, 1920  2 Sheets-Sheet 2
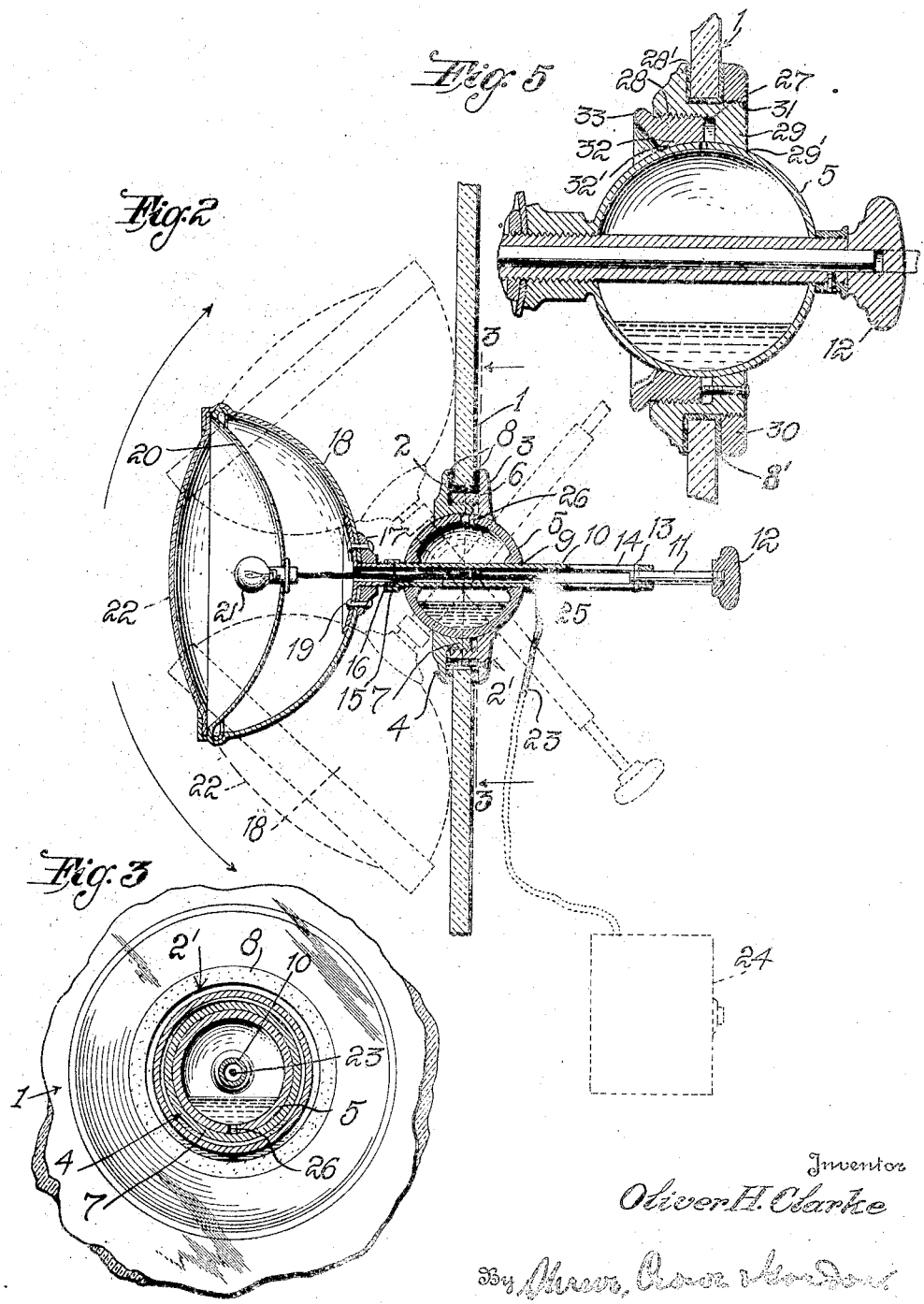
Inventor
Oliver H. Clarke

Patented July 15, 1924.

1,501,704

UNITED STATES PATENT OFFICE.

OLIVER H. CLARKE, OF WASHINGTON, DISTRICT OF COLUMBIA, ASSIGNOR, BY MESNE ASSIGNMENTS, TO CLYMER MANUFACTURING COMPANY, OF DENVER, COLORADO, A CORPORATION OF COLORADO.

SPOT OR SEARCH LIGHT ASSEMBLY.

Application filed March 17, 1920. Serial No. 366,683.

*To all whom it may concern:*

Be it known that I, OLIVER H. CLARKE, a citizen of the United States, residing at Washington, in the District of Columbia, have invented new and useful Improvements in Spot or Search Light Assemblies, of which the following is a specification.

This invention relates to an illuminating device for automobiles by means of which the driver of the car is enabled, without distraction from his duties as driver, to direct a projected beam of light in any desired direction forwardly or laterally of the automobile for the purpose of illuminating the road, the terrain at either side thereof, or signs or house numbers, the observation of which may be desirable.

With these ends and others in view, my invention is designed to be mounted in and supported by the glass of a windshield in a position readily accessible to the driver and in such a way as to minimize the danger of breaking the glass by the operation or adjustment of the device or by the jolts, jars and strains incident to ordinary driving.

In mounting my invention in the comparatively thin and easily breakable glass of varying thickness and contour commonly used in automobile windshields, it is important to support the spotlight from the thin glass in such a way as to ensure against breakage of the glass when it is subjected to the strains caused by swinging the spotlight to its various positions of adjustment and by the constant jars and vibrations incident to the ordinary use of an automobile. It is also of vital importance to so support the spotlight that it may be readily and easily adjusted by the operator of the car to any desired vertical or horizontal angle, and at the same time to so firmly maintain it in any position of adjustment as to prevent its being displaced from this adjusted position by jars or jolts incident to the travel of the car.

My invention is designed to meet these important and conflicting requirements incident to the mounting of a spotlight in the glass of an automobile windshield. It embodies, therefore, supporting means adapted to be mounted in an opening in the windshield glass and constructed to strengthen and reinforce the glass around the opening so that it will not be liable to fracture. The supporting means preferably includes adjustable members adapted to embrace the opposite faces of the glass and clamp the glass around the opening. Resilient or yielding means interposed between the clamping members and the glass provides a water tight joint between the windshield glass and the spotlight mounting which precludes leakage through the opening in the windshield glass, and also prevents the danger of water getting in between the clamps and the glass and freezing, which might thereby have a tendency to break the glass. This resilient or yielding means also serves as a cushion which prevents the breakage of the glass even though considerable force be quickly exerted to swing the spotlight from one position of adjustment to another.

In the use of my device, even though the yielding means have but slight resiliency, and only a minute yield, this is sufficient to eliminate, or at least greatly reduce, the danger of bending the glass and causing it to break, both during the mounting or assembling of the light on the glass and also in use. Furthermore, the resilient means distributes the clamping strains and compensates for inequalities in the thickness of the glass.

My invention enables a spotlight to be mounted in a glass windshield with great facility and with little danger of breakage of the glass, and permits of ready removability of the spotlight from the windshield glass in the event it becomes broken by accident, such as collision or otherwise, and replacement in a new windshield glass.

Among the other advantages of my invention, the following may be mentioned:

It reduces to a minimum the danger of rust affecting the working parts and the sticking incident to corrosion, and may be easily lubricated. It disposes the operating means of the light inside of the car and within convenient reach of the operator, who may manipulate and adjust the light without moving his position in the car. It in no wise conflicts with the swinging of the windshield itself to the varying positions of adjustment commonly used in the ordinary automobile and can be operated with equal facility whether the windshield is opened or closed. Due to the ready detachability of my spotlight, it may be easily removed from the glass windshield in which it is mounted and used for a trouble light, and thereafter readily replaced in the windshield glass without disturbing the windshield glass.

In the prevailing type of spotlight construction, the manner of mounting the spotlight is manifestly unsuited for cars of the closed type, or of the open type when the side curtains are attached. During inclement weather, or at any time when the car is completely enclosed, to obtain access to the lamp the operator must lower the window or detach the curtain on that side of the car to which the lamp is affixed, before it can be brought into operation, and if it be snowing or raining, this not only exposes the operator to the elements but allows the snow or rain to enter the car.

It is, therefore, the aim and purpose of this invention to mount the spotlight on the windshield glass, preferably in position not to interfere in any way with the vision of the operator and yet be within convenient reach when its use becomes necessary. This manner of mounting obviously avoids the occasion for opening the car to the elements, and affords complete protection at all times to its occupants, in consequence of which the spotlight becomes a practical and valuable adjunct to the closed car instead of merely a useless fixture, as is often the case with the present type. Moreover, a light of the character specified will contribute largely to the reduction of accidents, for the reason that the operator of closed cars having the search light always within convenient reach will be more apt to use it than in the case of the old design. This is especially true in emergencies where immediate use is required. With the old design, the operator would lack the time to lower the window and reach the light.

Many additional advantages and results are accomplished by my invention which will be apparent to users thereof, and I do not intend to be limited to the objects and purposes stated or the particular details of construction and combination of parts shown and described, as these may be variously modified by those skilled in the art without departing from my invention.

Referring now to the drawings in detail,

Figure 2 is a transverse vertical section of the search light and fragment of the windshield, several positions of the light being shown in dotted outlines;

Figure 3 is a sectional fragmentary view taken on the line 3—3 of Figure 2;

Figure 5 is an enlarged fragmentary sectionized detail view of a modified form of the ball and socket assembly.

Figure 1:
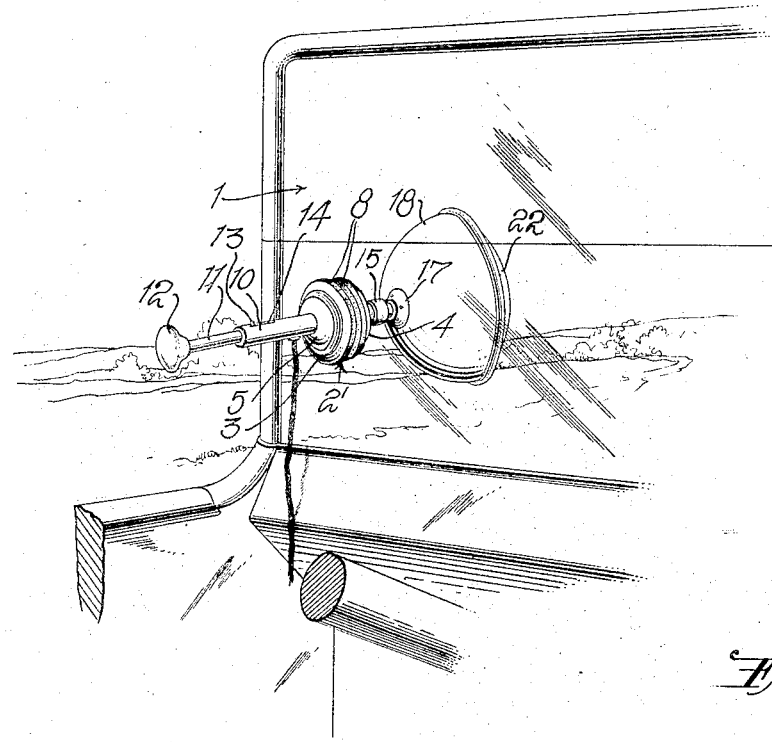
Figure 1 is a fragmentary perspective view of the spotlight and its mounting, illustrating the same positioned in an automobile windshield.

The spotlight attachment forming the subject-matter of my invention is constructed and arranged to be mounted directly in the aperture 2 of the glass of the windshield of an automobile so as to be in convenient reach of the driver. In general, the attachment comprises supporting means of desired construction having means for clamping the supporting means to the marginal portions of the glass about the aperture 2 of the windshield so that the entire weight of the supporting means and hence the attachment is carried by the glass, and in addition the supporting means is provided with a suitable bearing in which is shiftably mounted a member arranged to project through the opening in the glass and provided with a spotlight on its forward end, thus disposed in front of the glass, and with an operating means on its rear end operable from within the automobile. The light therefore is capable of being shifted to various positions of adjustment to project the light in the desired direction. In addition, means is provided for adjustably and yieldably clamping the supporting means to the glass, and for adjustably holding the light carrying member in its shifted position and for taking up wear occasioned by the repeated adjustments of the light carrying member in its bearing in the support.

In the simple embodiments of the invention illustrated in the drawings, the attachment contemplates a mounting for the spotlight which will permit it to be adjusted in a plurality of planes so that the light beam may be directed upwardly, downwardly, or laterally at will to cover a wide range. This mounting comprises a support or housing including complemental retaining rings 2' provided with clamping flanges 3 and 4 which are spaced apart so as to be disposed on opposite sides of the glass 1 of the windshield and are of such a diameter that their circumferential margins overlap and are opposed to the marginal portions of the glass around the opening 2. Resilient means 8, preferably in the form of yielding rings or washers, are interposed between the glass and the clamping flanges 3 and 4. In addition, the supporting means is provided at its inner circumference with a bearing preferably arranged as shown. This bearing in one form is substantially arcuate in shape to conform to the contour of the spherical bearing surface of a lamp supporting element or member 5, and more specifically, comprises the two relatively adjustable and complemental arcuate bearing surfaces formed on the inner periphery of the clamping flanges 3 and 4 of the supporting means to provide a bearing socket. In order to yieldingly clamp the glass in position between the two supporting rings, the supporting rings are provided with laterally extending flanges 6 and 7 suitably machined for threaded engagement. By adjusting the threaded connection between these flanges 6 and 7 the clamping members 3 and 4 are adjusted relatively to adjust the elastic pressure of the glass clamping means.

The practical importance of yieldably and resiliently mounting the spotlight in the glass by the employment of cushioning members between the support and the glass is of considerable moment. In the first place the glass may vary in thickness around the opening and were it not for the cushioning members an excessive and dangerous cushioning strain might be imposed upon the thicker portion of the glass when the clamping members are tightened in assembling the construction. Furthermore in the event of inequalities in the thickness of the glass the clamping members might engage the glass at one side of the opening and be spaced from the glass at the opposite side in which event the light would rattle and vibrate in the glass and sooner or later cause the glass to crack. The cushioning members distribute and equalize the compression of the clamping members, thereby preventing crushing of the glass or rattling of the light in the glass, and by distributing and equalizing the compression strains, promote the longevity of the assembly.

In addition to compensating for irregularities in glass thickness, the yielding cushioning members absorb to some extent and materially reduce the transmission to the glass of the vibrations of the light structure incidental to the travel of the car and the operation of the motor. It will be appreciated that the light itself projects a substantial distance in front and the handle a substantial distance behind the plane of the glass and gravity multiplied by the leverage of the handle and the light, to which may be added the sudden jars and jolts resulting from rough roads, impose material strains and stresses upon the windshield. Breakage of the glass would frequently occur from these causes, particularly when the light is mounted near the upper unreinforced edge of the lower section of the windshield as is frequently the case were these vibrations not partially absorbed by the cushioning members, and the stresses by them distributed and equalized in their transmission to the glass. It will be apparent that these clamping flanges 3 and 4 together with their yielding or resilient means 8 provide a circumferential reinforcement or strengthening means for the marginal edges of the glass about the aperture which tends to neutralize the effects of the vibrations and other strains incidental to the operations of the light and the adjustment of the parts of the attachment.

In the construction illustrated in Figure 2 of the drawings, the yieldable or resilient means 8 have another function, that of taking up wear and for holding the shiftable light in any of its adjusted positions with just the right pressure so that the light will be firmly held from being jarred out of adjustable position and will not rattle but at the same time is free enough to be quickly and easily shifted when the necessity arises.

Shiftably mounted in the bearing of the supporting means is a member carrying the spotlight. This shiftable member, in the form illustrated, is arranged to project on each side of the support so that an end of the member projects forwardly through the opening in the glass and to a position in front of the windshield. This end carries the spotlight. The opposite end of the shiftable member projects rearwardly through the glass opening into the vehicle. This end carries means for shifting the shiftable member to position the spotlight so that its beam of light may be directed forwardly or to either side of the automobile in any desired position and to any desired height.

Figure 4:
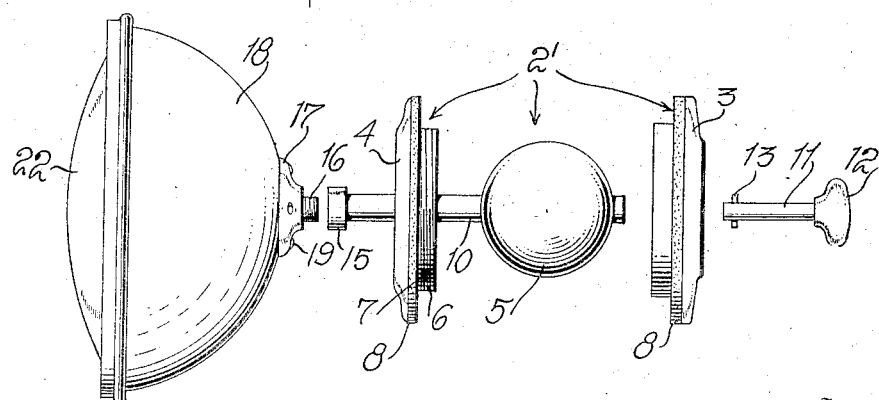
Figure 4 is a side elevation with parts disassembled in relative position.

In the form illustrated, the shiftable member comprises preferably a tubular member 10 on which is mounted the preferably spherical bearing member 5 of the universal connection. This bearing 5 is formed with a diametrical or axial bore 9 to receive the tubular member 10. One end of the tubular member 10 is provided with a longitudinal movable knob 12, consisting of a stem 11 having opposed pieces 13 projecting into slots 14. The other extremity of member 10 terminates in an enlarged flange 15 internally threaded to receive the threaded stem member 16 of retaining plate 17, the face of which is concaved to conform to the contour of the outer surface of the lamp casing 18 and rigidly attached thereto by bolts 19 or other suitable fastening means, as clearly shown in Figures 2 and 4 of the drawings.

Casing 18 is provided with a reflector 20, light bulb 21, lens 22, all of which may be of any form desired.

When it is desired to direct the beam of light to the desired point, the operator merely grasps the handle 12 and moves the shiftable member in its bearings in the supporting means as illustrated in Figure 2. Due to the construction shown in this figure the shiftable member is held in its various positions of universal adjustment by means of the threaded connection 6 and the gripping contact between inner bearing surfaces of the supporting means and the bearing surface of the spherical member 5. The nice adjustment of these bearing surfaces to hold the relatively movable bearing parts in predetermined shifted position, despite the jarring, jolting and vibrations of the automobile, while at the same time readily permitting the quick shifting of the lamp carrying member when the exigency arises, is afforded by the resilient yielding means between the glass and the clamping members, which means gives sufficiently to permit this adjustment and the taking up of wear and also acts as a cushioning to prevent the cracking of the glass.

Battery wires 23 are conducted from the battery not shown, around a reel as denoted by dotted lines 24, through opening 25 in tubular member 10, and thence through said tubular member to the electric bulb 21 within the lamp casing 18, as shown in Figure 2 of the drawings.

The spherical or arcuate shaped member 5 may also be utilized as an oil reservoir by the provision of an opening as at 26 through which the oil may be introduced to the interior of the ball member, and when it is desired to film the contacting surfaces of ball 5 and rings 3 and 4 with oil it is only necessary to invert the opening 26, as shown in Figure 3 of the drawings. Other means for oiling the parts may be employed without departing from the spirit of my invention.

It will thus be manifest that the specific constructional form of this invention, illustrated in Figure 2 of the drawings, includes a glass windshield 1 having an annular opening 2, a ball and socket universal joint seated in the opening, comprising retaining rings or flanges 3 and 4 and resilient or yielding means for elastically supporting the device on the marginal glass of the opening, a ball 5 seated in the socket formed by the rings or flanges; a tubular element 10 extending diametrically through the ball, an illuminating means and reflector secured to one extremity of the tube, and an operating handle affixed to the other to enable actuation of the light through any desired angle.

In some forms of my device it is desirable to provide separate means for adjusting the pressure of the clamping members against the marginal glass faces and for adjusting the bearings whereby to hold the shiftable member in adjusted position and to take up wear.

In the form of construction illustrated in Figure 5, the supporting means comprises a ring member 27 substantially Z-shaped in cross-section, forming an upwardly projecting circumferential clamping flange 28 and a downwardly projecting flange 29. The peripheral flange 28 is formed with a vertical inner surface 28', while the downwardly projecting flange 29 is formed with an arcuate lowermost surface 29' adapted to engage the surface of spherical member 5. An auxiliary ring or clamping flange 30 is threaded on the member 27 as at 31 and thus cooperates with the flange 28 to form a pocket for reception of the edge or marginal portion of the glass 1 surrounding the opening 2 therein. In this form just as in that disclosed in Figure 2, yielding resilient means 8' are provided for elastically mounting the glass 1, between these clamping flanges 28' and 30 to cushion the vibrations and to aid the clamping flanges to reinforce and strengthen the weakened marginal portions of the glass 1.

The separate means for taking up the wear of the bearing parts and for holding the shiftable member in adjusted position preferably comprises a retaining ring 32 which is threaded into the front of the Z-shaped member 27 and is formed with an arcuate bearing surface 32' which bears upon the surface of spherical member 5, and functions in conjunction with the arcuate bearing surface 29' of the member 27 to form a universal seating for said spherical member 5. To facilitate removal of locking ring 32 it is provided with a gripping flange 33.

In addition, the detachable ring 32 and the cooperative construction of the Z-shaped member 27 provide a more convenient and facile means for permitting the removal of the lamp for use as a trouble light. In this arrangement, by simply loosening sufficiently the retaining ring 32, the spherical member 5 and its accompanying assembly may be quickly removed from its position in the support without detaching or disturbing the clamping members 28 and 30 which yieldingly secure the support to the glass of the windshield.

It will be noted that in both of the foregoing specific embodiments of the invention, the attachment is arranged so that it can be quickly removed from the glass of the windshield either for purpose of replacement, repair or to enable the lamp to be used as a trouble light. For instance, in Figure 2 of the drawings, by unscrewing the threaded connection between the flanges 6 and 7, thus permitting the rings to be separated, the ball 5 and tube 10 carrying the lamp may be removed bodily from the rings, endwise through the opening in the glass of the windshield, the electric cable or cord 23 being made long for this purpose.

From the foregoing it is apparent that I have designed a spot or search light of great adaptability, eliminating the inherent deficiencies of those now in use, which is efficient in operation, simple in construction, and inexpensive to manufacture. The structural details by which the inherent principles of my invention may be embodied in practical form may obviously vary widely within the scope of my invention as defined in the following claims:

1. In combination, a windshield having an opening, and a spotlight device comprising a central member mounted for universal movement in said opening, a spotlight located on one side and a handle located on the other side of the windshield.

2. In combination, a supporting member having an opening therein, a housing provided with means to clamp the marginal edges of the supporting member about said opening, a spotlight, a handle, and a member intermediate and connecting the spotlight and handle and mounted for universal movement within the housing.

3. In combination, a windshield having an opening therein, a spotlight, a housing provided with means to secure it to the windshield at said opening, a ball therein, means for frictionally engaging the surface of said ball and yieldingly holding the same against turning movement, means extending from the ball at one side of the windshield for carrying the said spotlight, and a handle extending from the ball at the other side of the windshield by which universal movement of the spotlight may be had.

4. In combination, a windshield having an opening, a housing provided with means to secure it to the windshield at said opening, a ball therein, a spotlight extending from the ball on one side, a handle extending from the ball on the other side of the windshield and means applied to the housing for frictionally engaging the surface of the ball to permit universal movement, a part of said means being detachable to allow removal of the ball, spotlight and handle from the housing as occasion may require.

5. A spot or search light mounting comprising a spherical element, detachably connected socket rings embracing and supporting said element for universal movement, one of said rings having a radial flange and a threaded portion, and an auxiliary ring engaging said threaded portion and co-acting with the flange to seat and securely engage the supporting medium and a light projector carried by the spherical element.

6. The combination with a glass windshield, of a spotlight attachment projecting through the windshield, said attachment comprising a universally adjustable spotlight on the outside of the windshield, a manually operable member on the inside of the windshield for controlling the position of the spotlight, a connection between said spotlight and said member, means for retaining the spotlight in adjusted position, means for clamping said connection to the windshield glass, and yieldable members interposed between said clamping means and the glass.

7. In combination, a glass windshield having an opening therethrough, and a spotlight attachment comprising a support, means for yieldably clamping said support to the windshield, a spotlight at one side of the windshield, a handle at the opposite side thereof, and means carried by the support and connecting the handle and spotlight whereby the spotlight may be adjusted vertically and laterally from said handle.

8. The combination of a frangible windshield provided with an opening, a support extending through said opening and provided with means for yieldably engaging the opposite faces of said windshield to attach the support thereto, a spotlight on one side of the opening, a handle on the other side, and means carried by said support and movable relatively thereto whereby the position of said spotlight may be adjusted by manipulation of said handle.

9. A spotlight attachment for an apertured glass windshield comprising supporting means having opposed clamping members, yieldable means interposed between the clamping members and the opposite faces of the windshield glass around the aperture therein whereby said glass is reinforced, a member carried by and adjustable relatively to said supporting means, a spotlight attached to said member at one side of the supporting means, and a handle attached to said member at the opposite side of said supporting means whereby said spotlight may be adjusted into various vertical and horizontal angular positions.

10. The combination of a glass windshield, a universally adjustable spotlight in front of the windshield, an operating handle at the rear of the windshield, and means secured to and carried by the windshield glass for supporting said spotlight and handle so that the axis of the beam of light projected by the spotlight in front of the windshield may be adjusted to various angles relatively to the plane of the windshield by manipulation of the handle at the rear of the windshield.

11. The combination of a frangible windshield, a universally adjustable spotlight in front of the windshield, an operating handle at the rear of the windshield whereby the axis of the beam of light projected from the spotlight may be directed at various angles relatively to the plane of the windshield, a carrying member extending through the plane of the windshield by which said spotlight and handle are carried, and means for attaching said member to the frangible portion of the windshield, including means for yieldably embracing the opposite faces of said frangible portion.

12. A spotlight attachment for an apertured glass windshield of an automobile or the like, comprising a support, means including relatively adjustable flanges and yieldable members for firmly but yieldably clamping said support to the glass around the aperture therein, a spotlight supported by and movable relatively to said support so as to project its light in various vertical and horizontal directions in advance of the windshield, and means disposed at the rear of said windshield for adjusting said spotlight.

13. A combined spotlight and trouble light attachment for an apertured glass windshield of an automobile or the like, comprising supporting means, means for clamping said supporting means to the opposite marginal faces of the glass about the aperture therein, pressure distributing devices interposed between the clamping means and the glass, a spotlight carrying member supported by said supporting means and projecting through the opening in said glass, and a spotlight carried by said member forwardly of the glass, said supporting means being constructed to permit the withdrawal in a forward direction of said member and spotlight from said supporting means for use as a trouble light.

14. A combined spotlight and trouble light attachment for an apertured glass windshield of an automobile or the like, comprising supporting means, means engaging the opposite marginal faces of the glass about the aperture therein for securing the supporting means to the glass, a carrying member mounted in and extending through said supporting means, a spotlight carried by said member in front of the windshield glass, said member carrying the spotlight being bodily removable endwise in a forward direction from said supporting means for use as a portable trouble light.

15. A convertible spotlight and trouble light attachment for an apertured glass windshield comprising supporting means having opposed clamping devices adapted to be firmly clamped against the opposite marginal faces of the windshield glass about the aperture therein, a member carried by said supporting means in position to project through said aperture, a spotlight mounted on said member in front of the windshield, and means for normally preventing removal of said member from said supporting means, said last mentioned means being detachable to permit the endwise removal of said member in a forward direction through the supporting means.

16. The combination with a windshield provided with an opening, of a spotlight carrying member extending through said opening, a universally adjustable spotlight of larger diameter than said opening carried by said member forwardly of the windshield, and means for removably supporting said member from the windshield so as to permit the endwise withdrawal of said member with the spotlight thereon in a forward direction from said opening for use as a trouble light.

17. The combination with a glass windshield provided with an opening, of a spherical member disposed within said opening, a bearing support for said member provided with means for frictionally engaging the member to retain the same in adjusted position, clamping and cushioning means for embracing the opposite faces of the glass for attaching said support to the glass, a spotlight carried by said member forwardly of the windshield, and a handle carried by said member rearwardly of the windshield whereby said member may be adjusted in said support to protect the beam of light therefrom at any desired angle relatively to the plane of the glass.

18. The combination with a glass windshield provided with an opening, of a spherical member disposed within said opening, a bearing support for said member provided with means for frictionally engaging the member to retain the same in adjusted position, clamping and cushioning means embracing the opposite faces of the glass for attaching said support to the glass, a spotlight carried by said member forwardly of the windshield, and a handle carried by said member rearwardly of the windshield whereby said member may be adjusted in said support to project the beam of light therefrom at any desired angle relatively to the plane of the glass, a portion of the means for holding the spherical member in position being removable to permit the spotlight to be withdrawn in a forward direction from the windshield for use as a trouble light.

OLIVER H. CLARKE.

Witnesses:
WILLIAM A. LEE,
C. DUDLEY SHREVE.